(12) United States Patent
Thompson et al.

(10) Patent No.: US 8,332,667 B2
(45) Date of Patent: Dec. 11, 2012

(54) BATTERY DISCONNECTION FOR SECURE ASSEMBLY OF COMPUTER SYSTEMS

(75) Inventors: Paul M. Thompson, San Jose, CA (US); Mark A. Yoshimoto, San Jose, CA (US); Alex J. Crumlin, San Jose, CA (US); Val Valentine, Castro Valley, CA (US); Aaron J. Barber, San Jose, CA (US)

(73) Assignee: Apple Inc., Cupertino, CA (US)

( * ) Notice: Subject to any disclaimer, the term of this patent is extended or adjusted under 35 U.S.C. 154(b) by 415 days.

(21) Appl. No.: 12/769,161

(22) Filed: Apr. 28, 2010

(65) Prior Publication Data

US 2011/0167289 A1 Jul. 7, 2011

Related U.S. Application Data

(60) Provisional application No. 61/292,732, filed on Jan. 6, 2010.

(51) Int. Cl.
*G06F 1/26* (2006.01)

(52) U.S. Cl. ......... 713/300; 320/134; 361/90; 455/572

(58) Field of Classification Search ............... 320/134; 361/90; 455/572; 713/300
See application file for complete search history.

(56) References Cited

U.S. PATENT DOCUMENTS

| | | | | |
|---|---|---|---|---|
| 5,155,428 | A * | 10/1992 | Kang | 320/136 |
| 8,026,695 | B2 * | 9/2011 | De Koning et al. | 320/134 |
| 8,232,771 | B2 * | 7/2012 | Johnson et al. | 320/132 |

* cited by examiner

*Primary Examiner* — Albert Wang
(74) *Attorney, Agent, or Firm* — Park, Vaughan, Fleming & Dowler LLP; Chia-Hsin Suen

(57) ABSTRACT

The disclosed embodiments provide a system that configures a battery for a computer system. During operation, the system disconnects the battery by simulating a fault condition using a safety circuit of the battery. The fault condition may be simulated to facilitate safe assembly of a computer system containing the battery. After assembly is complete, the system enables use of the battery in the computer system by applying external power to the computer system, which resets the safety circuit and reconnects the battery.

23 Claims, 5 Drawing Sheets

BATTERY DISCONNECTION FOR SECURE ASSEMBLY OF COMPUTER SYSTEMS

RELATED APPLICATION

This application hereby claims priority under 35 U.S.C. §119 to U.S. Provisional Patent Application No. 61/292,732 filed 6 Jan. 2010, entitled "Battery Disconnection for Secure Assembly of Computer Systems," by inventors Paul Thompson, Mark Yoshimoto, Alex Crumlin, Val Valentine and Aaron Barber.

BACKGROUND

1. Field

The present embodiments relate to batteries for computer systems. More specifically, the present embodiments relate to a technique for disconnecting batteries for secure assembly of computer systems.

2. Related Art

Rechargeable batteries are presently used to provide power to a wide variety of portable electronic devices, including laptop computers, cell phones, PDAs, digital music players and cordless power tools. Because rechargeable battery cells typically contain volatile chemicals and electrodes which are prone to shorting, the battery cells are typically enclosed in a protective case to form a battery pack, which is then incorporated into the portable electronic device.

Using this type of battery pack normally leads to "double packaging" because the enclosure for the portable electronic device also provides physical protection for the battery cells. Hence, a significant amount of space and weight can be saved by eliminating the protective case surrounding the battery cells, and relying on the enclosure of the electronic device to protect the battery cells from mechanical damage.

However, this changes the assembly process, because instead of incorporating a protected battery pack into the system at the end of the assembly process, it makes more sense to place the unprotected and relatively fragile battery pack into the system enclosure first, before assembling the motherboard and other components on top of and around the battery cells.

In this case, it is undesirable for the battery pack to be providing power to the system as the motherboard and other components are being assembled, because doing so can potentially cause short circuits which could damage system components. Hence, a mechanism is needed for disconnecting the battery pack from the rest of the system until the system assembly is completed.

SUMMARY

Some embodiments provide a system that configures a battery for a computer system. During operation, the system disconnects the battery by simulating a fault condition using the safety circuit of the battery. The fault condition may be simulated to facilitate safe assembly of a computer system containing the battery. After assembly is complete, the system enables use of the battery in the computer system by applying external power to the computer system, which resets the safety circuit and reconnects the battery. Note that this system facilitates long-term storage of a portable computing device, for example prior to sale. In this case, the battery is reconnected automatically when the user connects the portable computing device to a charger for the first time.

In some embodiments, simulating the fault condition in the safety circuit involves sending a command to a gas-gauge circuit of the battery. In response to the command, the gas-gauge circuit generates an output signal corresponding to the fault condition.

In some embodiments, the command is sent to the gas-gauge circuit using a serial interface with the gas-gauge circuit.

In some embodiments, disconnecting the battery involves disconnecting one or more field-effect transistors (FETs) in the safety circuit using the output signal. This causes a voltage monitor coupled to the FETs to disconnect the battery by opening a set of switches.

In some embodiments, the external power resets the safety circuit by reconnecting the FETs and closing the switches.

In some embodiments, the fault condition corresponds to an undervoltage or an overvoltage.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
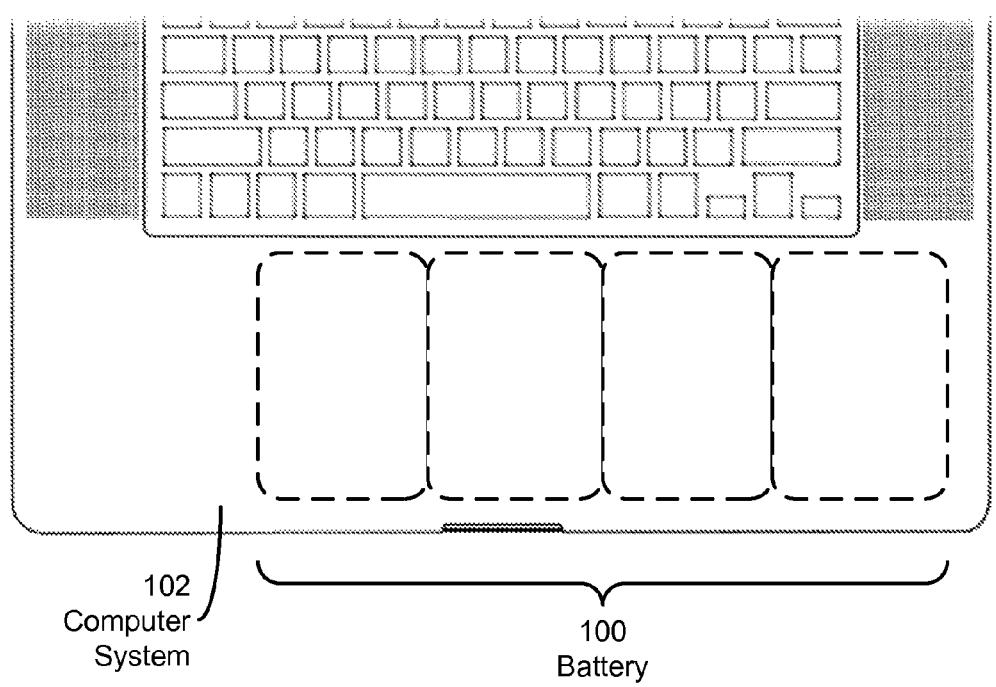
FIG. 1 shows an example of placement of a battery in a computer system in accordance with an embodiment.

FIG. 1 shows the placement of a battery 100 in a computer system 102 in accordance with an embodiment. Computer system 102 may correspond to a laptop computer, personal digital assistant (PDA), portable media player, mobile phone, digital camera, and/or other portable electronic device. Battery 100 may correspond to a lithium-polymer battery and/or other type of power source for computer system 102. For example, battery 100 may correspond to a lithium-polymer battery that includes one or more cells packaged in flexible pouches. The cells may then be connected in series and/or in parallel and used to power computer system 102.

In one or more embodiments, battery 100 is designed to accommodate the space constraints of computer system 102. For example, battery 100 may include cells of different sizes and thicknesses that are placed side-by-side, top-to-bottom, and/or stacked within computer system 102 to fill up the free space within computer system 102. The use of space within computer system 102 may additionally be optimized by omitting a separate enclosure for battery 100. For example, battery 100 may include non-removable pouches of lithium-polymer cells encased directly within the enclosure for computer system 102. As a result, the cells of battery 100 may be larger than the cells of a comparable removable battery which, in turn, may provide increased battery capacity and weight savings over the removable battery.

On the other hand, the elimination of a separate enclosure for battery 100 may complicate the assembly of computer system 102. First, battery 100 may be physically vulnerable until battery 100 is encased within the enclosure for computer system 102. For example, mishandling and/or physical contact with other components may damage the pouches, terminals, and/or cells of battery 100. To reduce the risk of physical damage to battery 100, battery 100 may be placed into the enclosure for computer system 102 near the beginning of the assembly process.

In turn, the early installation of battery 100 may cause electrical damage to other components in later stages of the assembly process. In particular, the assembly of computer system 102 may proceed by stacking components on top of a fully charged battery 100, which may cause current to flow from battery 100 to various electrical contacts within the enclosure. For example, the stacking of a motherboard on top of battery 100 may bring the terminals of battery 100 into contact with a set of spring fingers between battery 100 and the motherboard, thus producing a return path to battery 100. As a result, subsequent installation of components in computer system 102 may involve plugging the components into a live circuit, which may cause failures and/or other errors in the components.

Moreover, the use of mechanical guards to safeguard against such component failures may introduce new failures and/or impair performance in computer system 102. For example, the placing of a physical shim between battery 100 and electrical contacts during assembly may prevent the flow of current from battery 100 but may also damage battery 102 and/or other components. Similarly, the addition of electrical components to disconnect battery 100 during assembly may interfere with the electrical performance and/or design of computer system 102. For example, battery 100 may be disconnected during assembly by modifying the circuitry on the motherboard and/or adding a physical switch to the enclosure of computer system 100. However, the addition of electrical components along the return path to battery 100 may decrease the electrical efficiency of computer system 102, while the use of physically exposed switches may interfere with the design goals of computer system 102.

In one or more embodiments, battery 100 is disconnected during the assembly of computer system 102 using existing safety mechanisms associated with the monitoring of battery 100. More specifically, a resettable fault condition may be simulated using a safety circuit of battery 100 to disconnect battery 100. After assembly is complete, the application of external power to computer system 102 may reset the safety circuit and reconnect battery 100. As discussed in further detail below, the disconnection and reconnection of battery 100 using the safety circuit may facilitate the safe assembly of computer system 102 with little to no power loss, and may also ensure the normal use of battery 100 in powering computer system 102 after assembly is complete.

Figure 2:
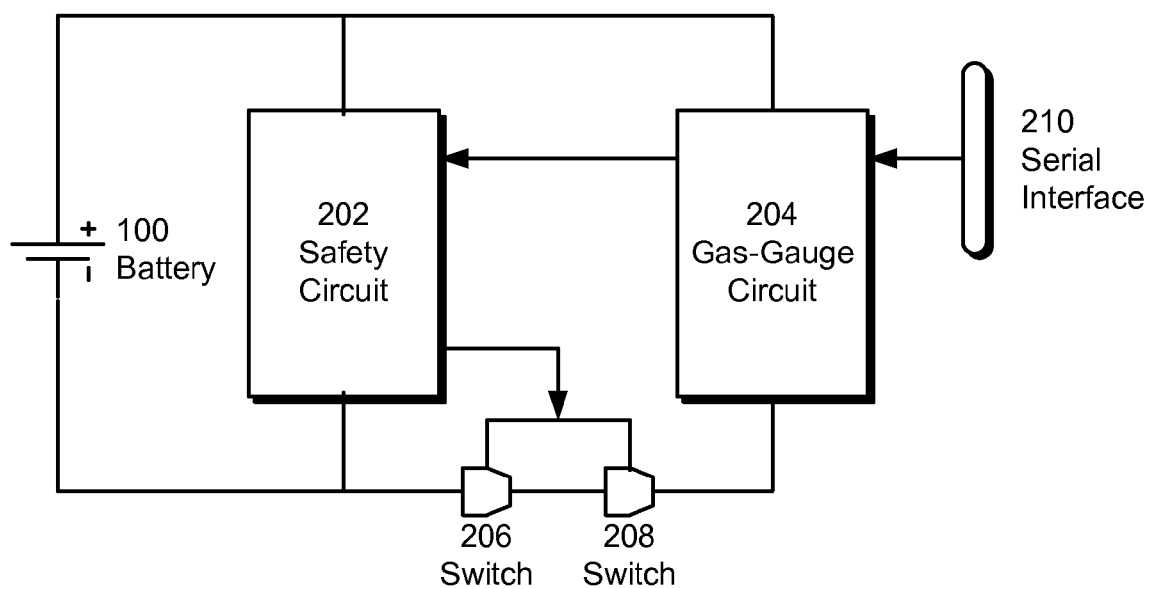
FIG. 2 shows an example of a system for configuring a battery in accordance with an embodiment.

FIG. 2 shows a system for configuring battery 100 in accordance with an embodiment. In particular, FIG. 2 shows a system for disconnecting and reconnecting battery 100 to facilitate safe assembly of a computer system (e.g., computer system 102 of FIG. 1) containing battery 100. As shown in FIG. 2, the system includes a safety circuit 202, a gas-gauge circuit 204, and a set of switches 206-208, and could contain a serial interface 210. Each of these components is described below in further detail.

Gas-gauge circuit 204 may include functionality to monitor a number of attributes associated with battery 100. For example, gas-gauge circuit 204 may obtain current, voltage, and/or temperature measurements from one or more sensors in battery 100. Gas-gauge circuit 204 may then use the measurements to determine the state-of-charge, impedance, capacity, charging voltage, and/or remaining charge of battery 100.

In one or more embodiments, battery 100 is disconnected by sending a command to gas-gauge circuit 204 using serial interface 210. In response to the command, gas-gauge circuit 204 may generate an output signal corresponding to a fault condition in battery 100. For example, the output signal may represent an overvoltage or undervoltage in battery 100. Upon detecting the simulated fault condition, safety circuit 202 may disconnect battery 100 from a load by opening switches 206-208.

As mentioned previously, battery 100 may be disconnected to facilitate the safe assembly of the computer system. In particular, battery 100 may be embedded in the enclosure of the computer system and lack a separate enclosure. For example, battery 100 may correspond to a non-removable lithium-polymer battery that provides increased capacity, weight savings, and space savings to the computer system over a comparable battery with a separate battery enclosure. Because battery 100 is non-removable, battery 100 may be placed into the computer system's enclosure before the motherboard, hard disk drive (HDD), memory, optical drive, and/or other components in the computer system are installed.

To prevent issues associated with the installation of components while the computer is in a powered state, battery 100 may be disconnected during the assembly of the computer system. After assembly is complete, the application of external power to the computer system may reconnect battery 100 and enable the use of battery 100 in powering the computer system. Reconnection of battery 100 by applying external power is discussed in further detail below with respect to FIGS. 3 and 5.

In other words, events associated with normal monitoring and use of battery 100 may be used to disconnect and reconnect battery 100. In particular, battery 100 may be disconnected by leveraging existing safety mechanisms provided by safety circuit 202 (see FIG. 2), while an event associated with initial use of the computer system (e.g., plugging the computer into a power outlet) may reconnect battery 100 for use in the computer system. The system of FIG. 2 may thus prevent issues associated with the live assembly of the computer system with little to no power loss and/or overhead to the end user of the computer system.

Figure 3:
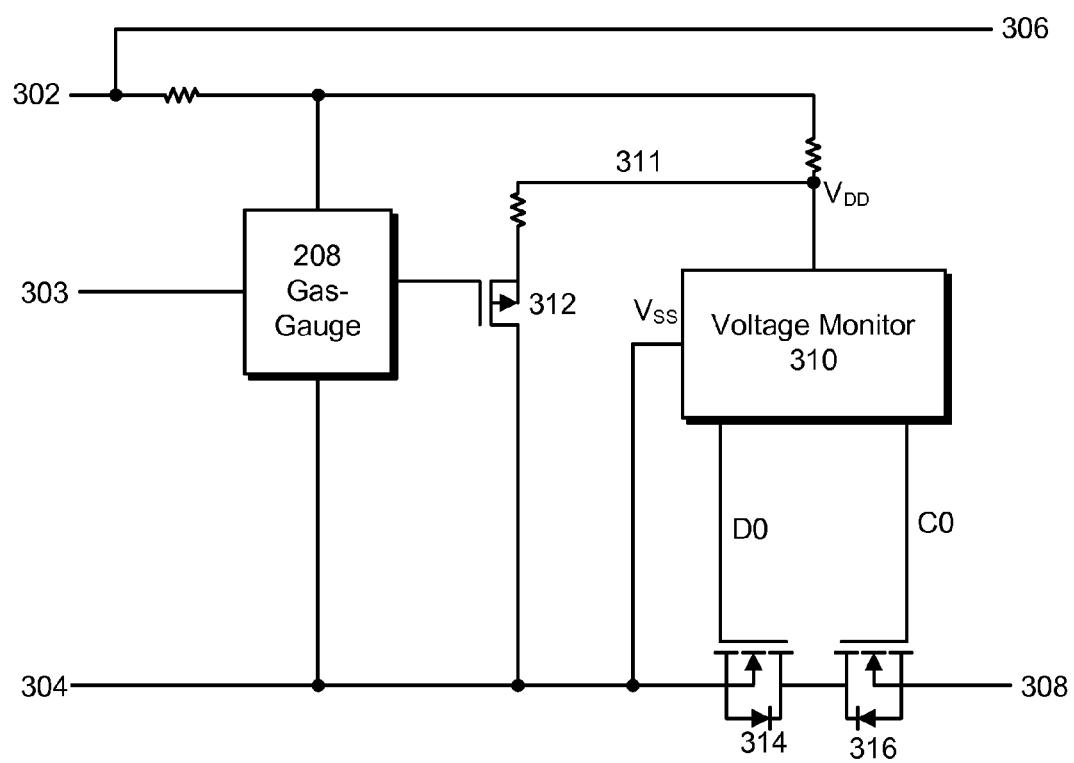
FIG. 3 shows an example of circuitry for disconnecting and reconnecting a battery in accordance with an embodiment.

FIG. 3 shows circuitry for disconnecting and reconnecting a battery (e.g., battery 100 of FIG. 1) in accordance with an embodiment. More specifically, FIG. 3 shows the structure of a safety circuit (e.g., safety circuit 202 of FIG. 2) for the battery. As shown in FIG. 3, four lines 302, 304, 306 and 308 connect the safety circuit to other electrical components. Line 302 may connect to the positive terminal of the battery, line 304 may connect to the negative terminal of the battery, line 306 may connect to the positive terminal of a load (e.g., computer system) powered by the battery, and line 308 may correspond to the negative terminal of the load.

Turning on FET 312 for some period of time (for example, for two seconds) creates a voltage divider with path 311 $V_{DD}$ to simulate an undervoltage condition, as detected by a voltage monitor 310 in the safety circuit. Because the simulated undervoltage represents a fault condition in the battery, voltage monitor 310 responds to the simulated undervoltage by opening switches 314 and 316 and disconnecting the battery along the path from the negative terminal of the battery to the negative load terminal.

Once the battery is disconnected because of the temporary undervoltage condition, voltage monitor 310 will maintain FETs 314 and 316 in an off state indefinitely until a charging power supply is connected to the battery pack terminals.

To reconnect the battery, external power is applied to lines 306 and 308 causing voltage monitor 310 to turn FETs 314 and 316 on and to connect the negative terminal of the battery to the negative terminal of the load. In turn, the simulated undervoltage may be removed by keeping FET 312 off.

Consequently, the use of existing safety mechanisms to disconnect the battery may minimize power loss, while the presence of a latch in the safety circuit may ensure that the battery remains disconnected until the battery is ready for use (e.g., powering a computer system). Moreover, the resettable state of the safety circuit may ensure that normal use and monitoring of the battery may proceed after the battery is reconnected.

Figure 4:
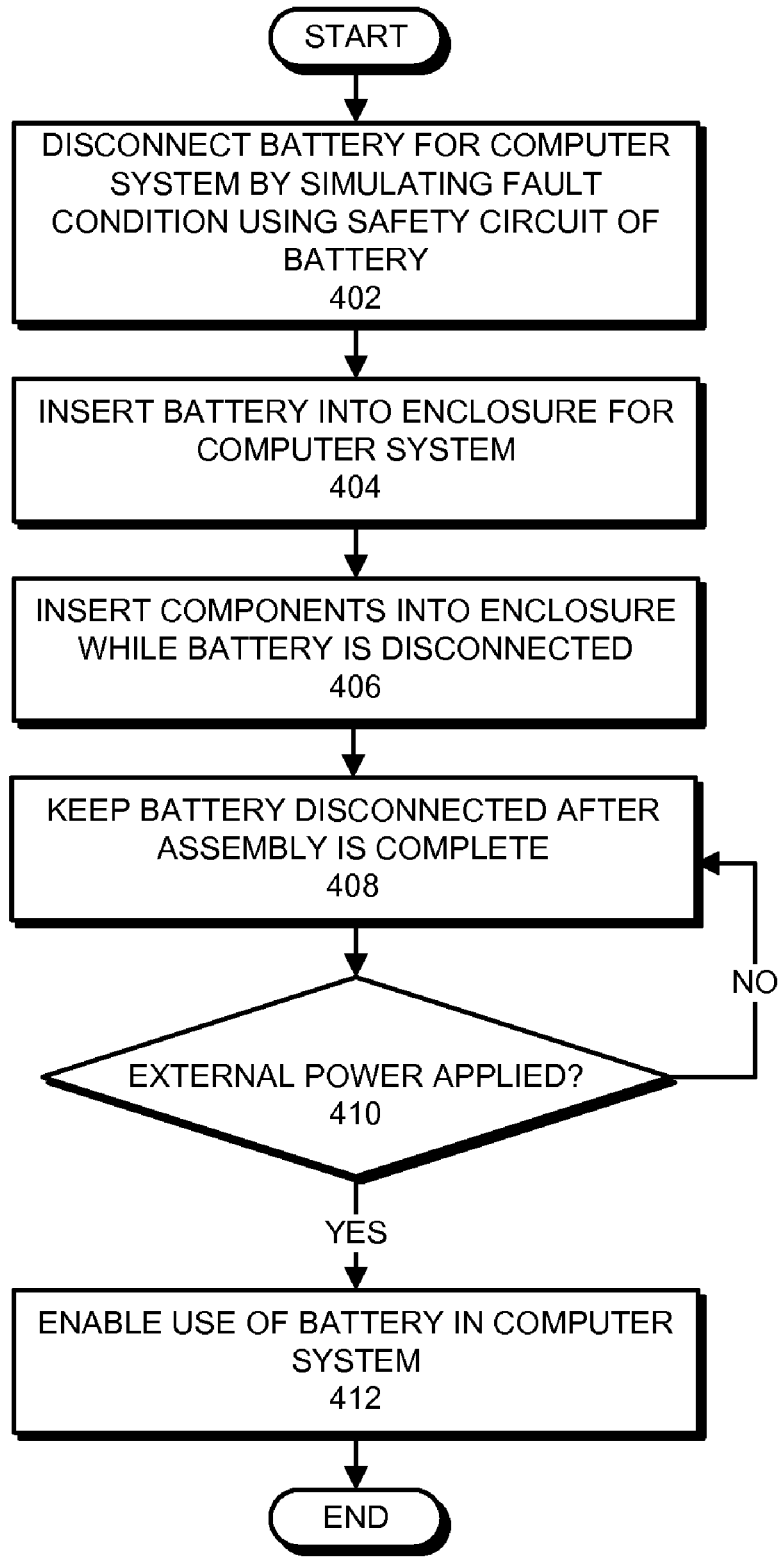
FIG. 4 shows a flowchart illustrating an example of a process for assembling a computer system in accordance with an embodiment.

FIG. 4 shows a flowchart illustrating the process of assembling a computer system in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

First, a battery for the computer system is disconnected by simulating a fault condition to a safety circuit in the battery (operation 402). The battery may correspond to a non-removable battery and lack a separate battery enclosure. As a result, the battery may be inserted into the enclosure of the computer system (operation 404) before other components in the computer system. The assembly may then proceed by inserting the components into the enclosure while the battery is disconnected (operation 406) to facilitate safe assembly of the computer system.

The battery may be kept in a disconnected state after assembly is complete (operation 408) until external power is applied (operation 410). Once external power is applied, the use of the battery in the computer system is enabled (operation 412). For example, the battery may continue to be disconnected as the computer system is shipped to minimize self-discharge and/or damage to the battery. Moreover, the subsequent application of external power may indicate that a user is preparing to use the computer system and trigger the reconnection of the battery. The battery may thus be kept in a disconnected state to maintain the battery's integrity and charge until the battery is ready for use.

Figure 5:
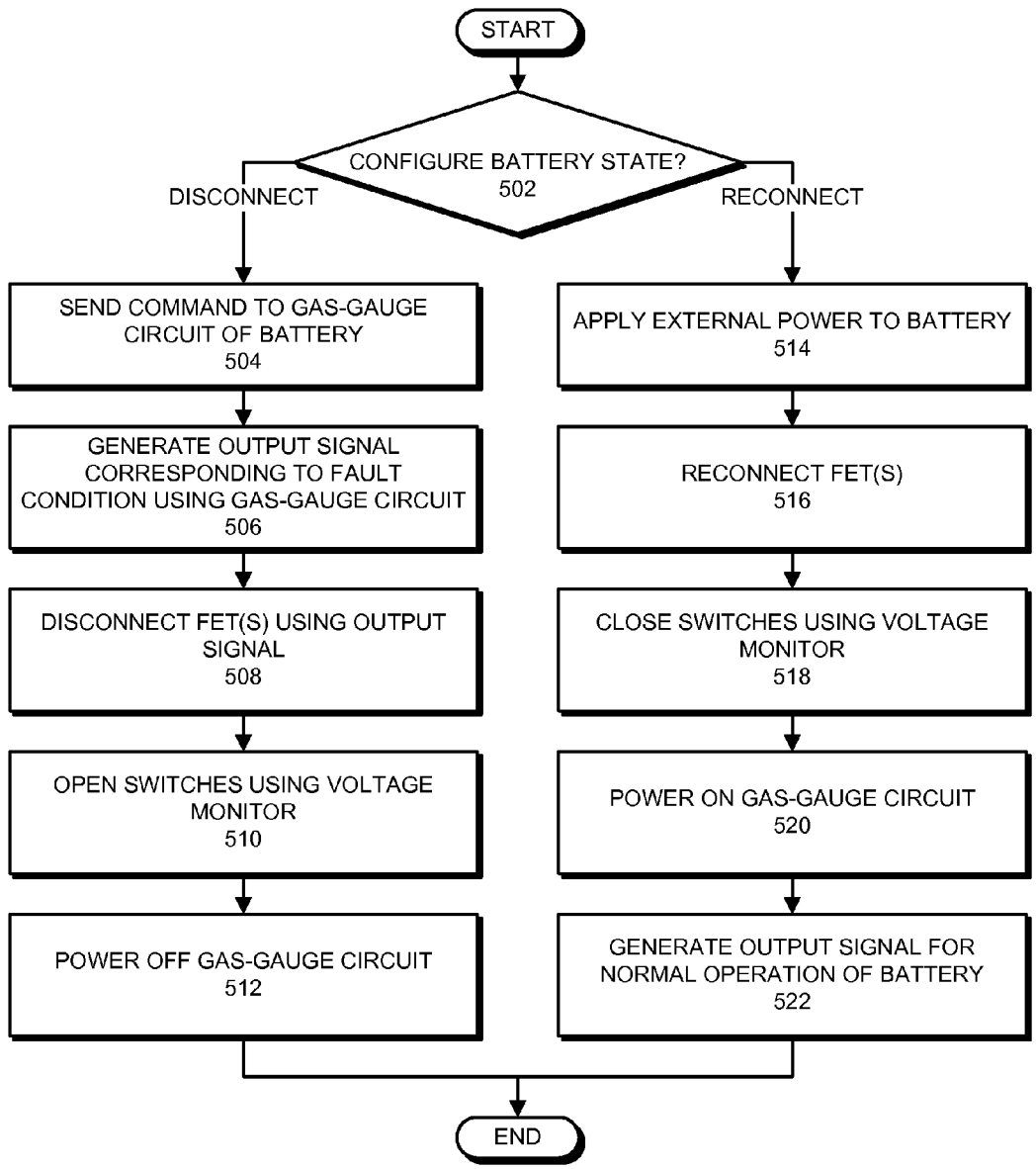
FIG. 5 shows a flowchart illustrating an example of a process for configuring a battery in accordance with an embodiment.

FIG. 5 shows a flowchart illustrating the process of configuring a battery in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

In particular, the battery's state may be configured (operation 502) by disconnecting the battery or reconnecting the battery. As discussed above, the battery may be disconnected to facilitate safe assembly of a computer system containing the battery. If the battery is to be disconnected, a command is sent to a gas-gauge circuit of the battery (operation 504). The command may be sent through a serial interface with the gas-gauge circuit. In response to the command, the gas-gauge circuit may generate an output signal corresponding to a fault condition (operation 506) in the battery, such as an overvoltage or an undervoltage. For example, the gas-gauge circuit may transition from a low output signal to a high output signal for two seconds in response to the command.

The output signal may disconnect one or more FETs (operation 508) in a safety circuit of the battery. The disconnected FET(s) may simulate the fault condition in a voltage monitor and cause the voltage monitor to disconnect the battery by opening a set of switches (operation 510). For example, the switches may disconnect the path from the negative terminal of the battery to the negative load terminal of a load connected to the battery. The FETs may additionally power off the gas-gauge circuit (operation 512) to complete the disconnection of the battery and the disabling of the safety circuit.

After assembly is complete, the battery may be reconnected to enable use of the battery in the computer system. If the battery is to be reconnected from the disconnection described in operations 504-512, external power is applied to the battery (operation 514). The external power may reconnect the FET(s) (operation 516) and cause the voltage monitor to close the switches (operation 518), thus completing the return path to the battery.

The reconnected FET(s) may additionally power on the gas-gauge circuit (operation 520). For example, a reconnected FET may allow the external power to reach the gas-gauge circuit. The gas-gauge circuit may then complete the resetting of the safety circuit by generating an output signal for normal operation of the battery (operation 522). As a result, the application of external power may reconnect the battery and reset the safety circuit for subsequent use and monitoring of the battery.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for configuring a battery for a computer system, comprising:
   disconnecting the battery by simulating a fault condition using a safety circuit of the battery;
   inserting the battery into the computer system; and
   enabling use of the battery in the computer system by applying external power to the computer system, wherein the external power resets the safety circuit and reconnects the battery.

2. The method of claim 1, wherein simulating the fault condition in the safety circuit involves:
   sending a command to a gas-gauge circuit of the battery, wherein the gas-gauge circuit generates an output signal corresponding to the fault condition in response to the command.

3. The method of claim 2, wherein the command is sent to the gas-gauge circuit using a serial interface with the gas-gauge circuit.

4. The method of claim 2, wherein disconnecting the battery involves:
   disconnecting one or more field-effect transistors (FETs) in the safety circuit using the output signal,
   wherein the disconnected FETs cause a voltage monitor coupled to the FETs to disconnect the battery by opening a set of switches.

5. The method of claim 4, wherein the external power resets the safety circuit by reconnecting the FETs and closing the switches.

6. The method of claim 1, wherein the fault condition corresponds to an undervoltage or an overvoltage.

7. The method of claim 1, wherein the battery is disconnected to facilitate safe assembly of the computer system.

8. A method for configuring a computer system, comprising:
   disconnecting a battery for the computer system by simulating a fault condition using a safety circuit of the battery;
   inserting the battery into an enclosure for the computer system; and
   inserting a set of components into the enclosure while the battery is disconnected to facilitate safe assembly of the computer system,
   wherein use of the battery is enabled after assembly of the computer system is complete by applying external power to the computer system.

9. The method of claim 8, wherein simulating the fault condition in the safety circuit involves:
   sending a command to a gas-gauge circuit of the battery, wherein the gas-gauge circuit generates an output signal corresponding to the fault condition in response to the command.

10. The method of claim 9, wherein the command is sent to the gas-gauge circuit using a serial interface with the gas-gauge circuit.

11. The method of claim 9, wherein disconnecting the battery involves:
    disconnecting one or more field-effect transistors (FETs) in the safety circuit using the output signal,
    wherein the disconnected FETs cause a voltage monitor coupled to the FETs to disconnect the battery by opening a set of switches.

12. The method of claim 8, wherein the fault condition corresponds to an undervoltage or an overvoltage.

13. The method of claim 8, wherein the external power resets the safety circuit and reconnects the battery.

14. A system for configuring a battery, comprising:
    a safety circuit configured to disconnect the battery upon detecting a fault condition; and
    a gas-gauge circuit configured to facilitate safe assembly of a computer system containing the battery by simulating the fault condition in the safety circuit,
    wherein use of the battery is enabled after assembly is complete by applying external power to the computer system.

15. The system of claim 14, wherein simulating the fault condition in the safety circuit involves:
    sending a command to the gas-gauge circuit, wherein the gas-gauge circuit generates an output signal corresponding to the fault condition in response to the command.

16. The system of claim 15, wherein the command is sent to the gas-gauge circuit using a serial interface with the gas-gauge circuit.

17. The system of claim 15, wherein disconnecting the battery involves:
    disconnecting one or more field-effect transistors (FETs) in the safety circuit using the output signal,
    wherein the disconnected FETs cause a voltage monitor coupled to the FETs to disconnect the battery by opening a set of switches.

18. The system of claim 14, wherein the external power resets the safety circuit and reconnects the battery.

19. A computer system, comprising:
    a set of components powered by a battery;
    a safety circuit configured to disconnect the battery upon detecting a fault condition; and
    a gas-gauge circuit configured to facilitate safe insertion of the components into the computer system by simulating the fault condition in the safety circuit,
    wherein use of the battery is enabled after assembly of the computer system is complete by applying external power to the computer system.

20. The computer system of claim 19, wherein simulating the fault condition in the safety circuit involves:
    sending a command to the gas-gauge circuit, wherein the gas-gauge circuit generates an output signal corresponding to the fault condition in response to the command.

21. The computer system of claim 20, wherein the command is sent to the gas-gauge circuit using a serial interface with the gas-gauge circuit.

22. The computer system of claim 20, wherein disconnecting the battery involves:
    disconnecting one or more field-effect transistors (FETs) in the safety circuit using the output signal,
    wherein the disconnected FETs cause a voltage monitor coupled to the FETs to disconnect the battery by opening a set of switches.

23. The computer system of claim 19, wherein the external power resets the safety circuit and reconnects the battery.

* * * * *